United States Patent [19]
Fukuo et al.

[11] Patent Number: 4,729,352
[45] Date of Patent: Mar. 8, 1988

[54] CRANKSHAFT SUPPORTING STRUCTURE FOR MULTICYLINDER INTERNAL COMBUSTION ENGINES

[75] Inventors: Koichi Fukuo; Takao Ito, both of Saitama; Katsumi Ichida, Tokyo, all of Japan

[73] Assignee: Honda Giken Kogyo Kabushiki Kaisha, Tokyo, Japan

[21] Appl. No.: 802,696

[22] Filed: Nov. 27, 1985

[30] Foreign Application Priority Data

Nov. 28, 1984 [JP] Japan .................. 59-180653[U]
Nov. 28, 1984 [JP] Japan .................. 59-180654[U]
Dec. 6, 1984 [JP] Japan .................. 59-258153

[51] Int. Cl.[4] ........................ F02F 7/00; F01M 1/00
[52] U.S. Cl. ........................ 123/195 R; 123/195 C; 123/195 R
[58] Field of Search ........... 123/195 R, 195 H, 195 C, 123/195 S, 196; 184/6.5–6.9

[56] References Cited
U.S. PATENT DOCUMENTS

| | | | |
|---|---|---|---|
| 853,288 | 5/1907 | Weidely | 123/195 R |
| 3,841,203 | 10/1974 | Bruce | 123/195 H |
| 4,393,822 | 7/1983 | Obermayer et al. | 123/195 R |

*Primary Examiner*—Craig R. Feinberg
*Attorney, Agent, or Firm*—Lyon & Lyon

[57] ABSTRACT

A crankshaft support structure for a multicylinder internal combustion engine employing a plurality of bearing caps with pairs of vertical and horizontal surfaces fitting mating surfaces in the cylinder block for structurally mating the bearing caps to the cylinder block. A structural bridge extends across the bearing caps and is connected through the bearing caps to the block by one set of bolts and directly to the block by a second set of bolts. A second embodiment employs a third set of bolts connecting the bearing caps separately to the block. Arcuate baffle plates form the portion of the bridge between bearing caps to inhibit oil agitation and suppress noise.

19 Claims, 6 Drawing Figures

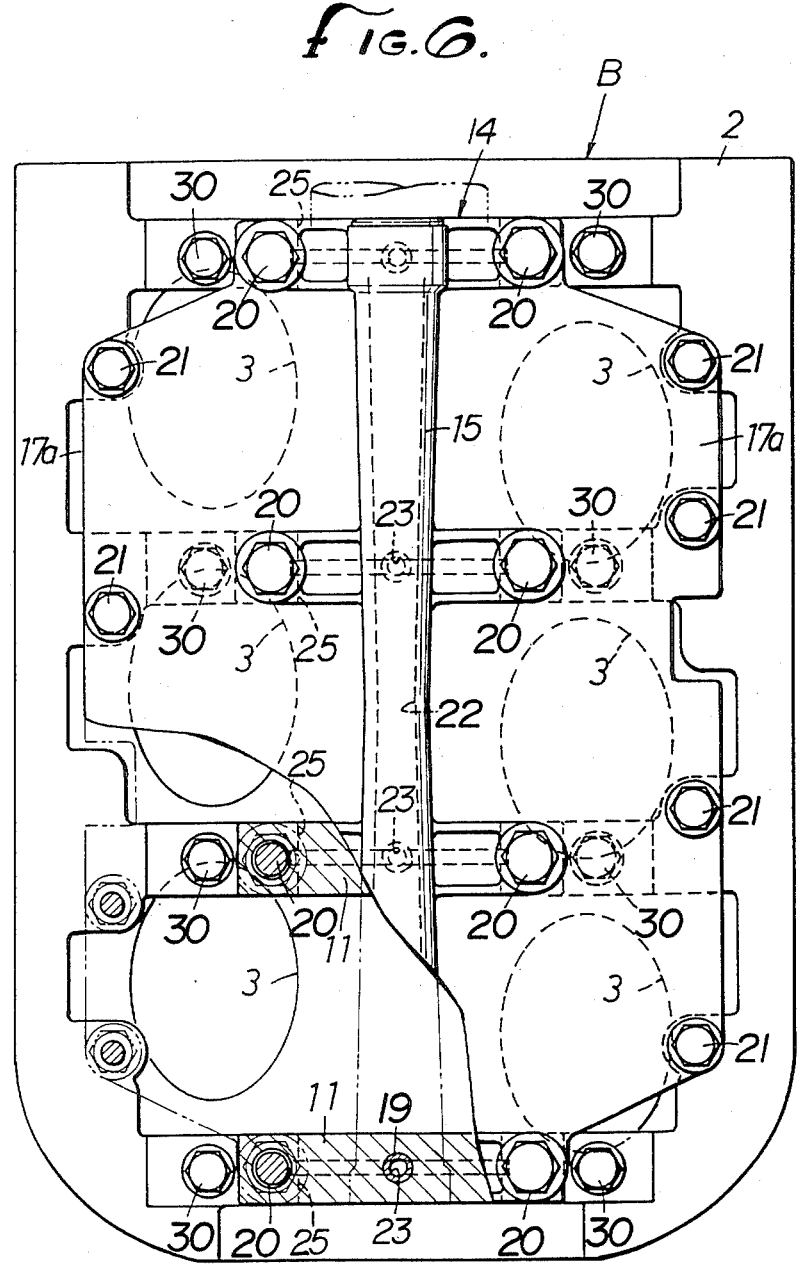

CRANKSHAFT SUPPORTING STRUCTURE FOR MULTICYLINDER INTERNAL COMBUSTION ENGINES

The present invention relates to a crankshaft supporting structure for an in-line or V-shaped multicylinder internal combustion engine and, in particular, to a structural bridge and bearing cap arrangement for increasing the rigidity of the assembled engine.

In the most common conventional construction of an internal combustion engine the crankshaft is removably supported on the cylinder block by a plurality of main bearings with a like plurality of bearing caps securing the main bearings and crankshaft to the cylinder block. In such an arrangement the structural rigidity of the engine is supplied almost entirely by the cylinder block with the bearing caps adding slightly to the lateral rigidity only. Various structures have been proposed, such as shown in U.S. Pat. Nos. 3,046,954 and 3,841,203 for increasing the structural rigidity of an engine by interconnecting some or all of the bearing caps with bridge elements or the like but each of the prior proposals have had various deficiencies or disadvantages.

In view of the prior art, it is an object of the present invention to provide a crankshaft supporting stucture for multicylinder internal combustion engines which is composed of cylinder block journal walls, bearing caps, and a bridge that are firmly coupled together for increased rigidity, and which is structured to simplify a seal between a crankcase and an oil pan.

Another object of this invention is to provide such a structure wherein the cylinder block journal walls extend downwardly beyond the crankshaft and have recesses for receiving the bearing caps. A further object of this invention is to provide such a structure wherein the recesses and bearing caps are closely filled in the lateral direction to further improve rigidity.

A still further object of this invention is to provide such a structure wherein the bridge has arcuate walls closely spaced from the crankshaft counter weights for increasing the bridge strength, reducing oil agitation and reducing engine noise.

According to the present invention, the aforesaid objects are accomplished by a crankshaft supporting structure in a multicylinder internal combustion engine having a plurality of bearing caps secured to a plurality of journal walls integral with the cylinder block with bearing caps rotatably supporting a crankshaft between the bearing caps and the journal walls and a bridge extending across and secured to the lower surfaces of the bearing caps. The bridge extends in a lateral direction normal to the crankshaft across the bearing caps to lateral portions of the journal walls with the bridge and the bearing caps being secured together and to the journal walls by first connecting bolts and the bridge being secured to the journal walls by second connecting bolts positioned laterally outwardly of the first connection bolts, and the first and second connecting bolts being positioned inwardly of portions where skirt walls of the crankcase and an oil pan are joined together. The bearing caps fit in recesses in the journal walls for added rigidity and the bridge is shaped to maximize strength and minimize oil agitation and noise.

The preferred embodiments in which the present invention is incorporated in a V6 internal combustion engine will be described with reference to the drawings, wherein:

FIG. 6 is a bottom view, with portions shown in section, taken substantially on the line VI—VI in FIG. 4.

Figure 1:
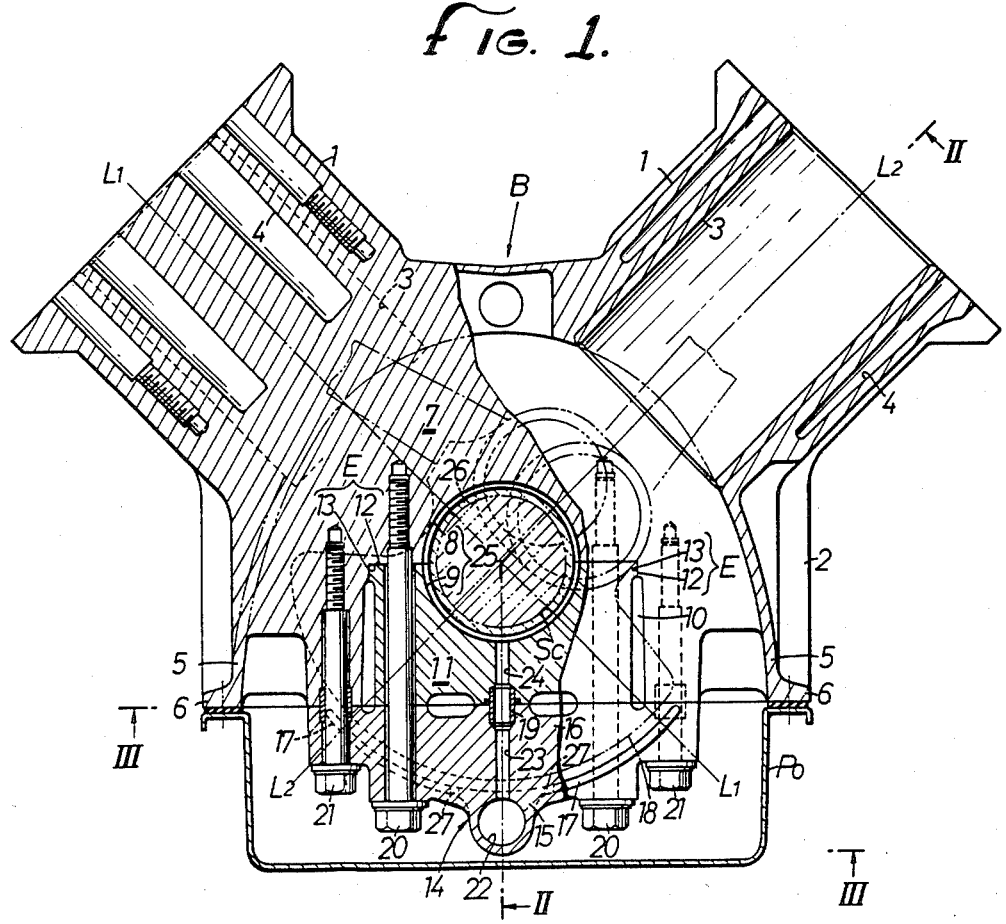
FIG. 1 is a sectional end view of a first embodiment of the crankshaft support structure of this invention in cylinder block of an internal combustion engine.

In the drawings of the two embodiments many of the components and the functions are identical or substantially similar and therefore like numerals and letters will be used to refer to such components for clarity of description and such components will only be described in detail with respect to the first embodiment but it shall be understood that the description is equally applicable to the second embodiment unless stated otherwise.

Figure 2:
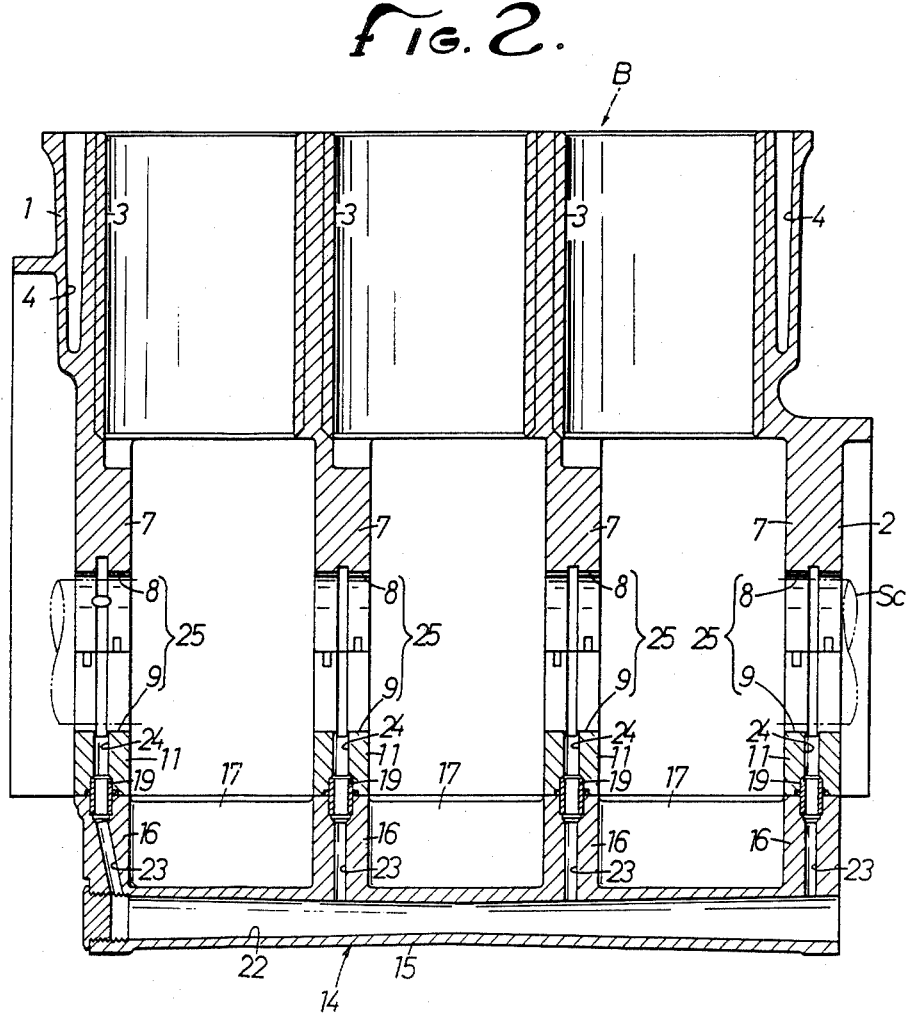
FIG. 2 is a sectional side view of the structure of FIG. 1 taken substantially on the line II—II in FIG. 1.
Figure 3:
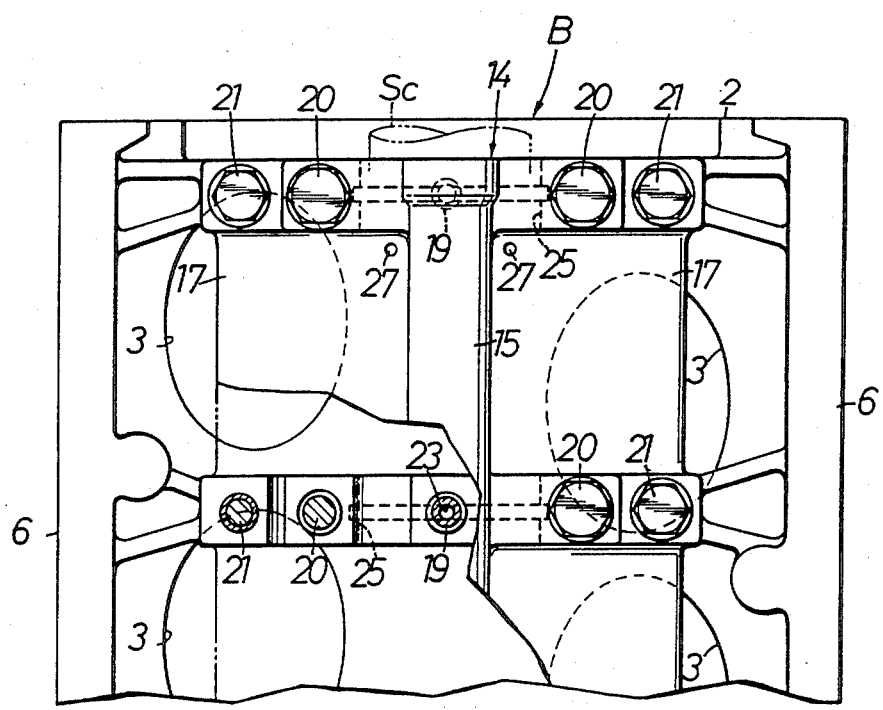
FIG. 3 is a bottom view, with portions shown in section, of the structure shown in FIGS. 1 and 2 taken substantially on the line III—III in FIG. 1.

Referring now to the first embodiment of FIGS. 1-3, only the cylinder block and oil pan portion of the internal combustion engine are shown. The internal combustion engine has a cylinder block B, which is preferably made of an aluminum alloy casting, comprising two cylinder housings 1 arranged in a V shape and having inclined cylinder axes $L_1$—$L_1$ and $L_2$—$L_2$, respectively, and a crankcase 2 integrally connecting the lower coupled portions of the cylinder housings 1.

The cylinder housings 1 each have three in-line cylinder bores 3 and water jackets 4 defined in the respective walls thereof in surrounding relation to the cylinder bores 3.

The crankcase 2 has a pair of integral downwardly extending skirt walls 5 confronting each other and extending along a crankshaft Sc. The skirt walls 5 have integral attachment flanges 6 on their lower ends. An oil pan Po of a U-shaped cross section is secured through a sealing gasket to the lower surfaces of the attachment flanges 6. Lubricating oil is stored in the oil pan Po.

The crankcase 2 also includes four integral journal walls 7 spaced at intervals along the crankshaft Sc, as shown in FIG. 2. A downwardly opening recess 10 of a channel-shaped cross section is defined centrally in each of the journal walls 7. The journal walls 7 have semicircular bearing halves 8 defined in the respective upper central portions of recesses 10 for supporting the crankshaft Sc. Inwardly and downwardly facing mating surfaces 12 are defined on inner opposite sides of the recess 10 at the upper portion thereof.

A bearing cap 11, preferably of an iron alloy, has a rectangular cross section and is fitted in the recess 10 of each of the journal walls 7. Each of the bearing caps 11 has a flat upper surface held against the lower surface of one of the journal walls 7 and a semicircular bearing half 9 defined centrally in the flat upper surface thereof in registry with one of the bearing halves 8 of the journal wall 7. Outwardly and upwardly mating surfaces 13 are defined on outer opposite sides of the upper portion of the bearing caps 11 along the crankshaft Sc for mating engagement with the journal wall mating surfaces 12. The mating surfaces 12, 13 are closely fitted together to provide closely mating portions E. Each of the bearing caps 11 has a flat lower surface lying substantially flush with the lower surfaces of the journal walls 7 and the skirt walls 5.

A bridge 14, preferably made of an aluminum alloy, is fixedly positioned below the journal walls 7 and the bearing caps 11, and extends across the journal walls 7 along the crankshaft Sc. The bridge 14 also extends in a direction normal to the crankshaft Sc to lie beneath both the journal walls 7 and the bearing caps 11.

The bridge 14 is composed of a main portion 15 extending along the crankshaft Sc, a plurality of legs 16 integrally projecting upwardly from the main portion 15 toward the bearing caps 11, and baffle plates 17 extending transversely to connect between the legs 16. The baffle plates 17 are of an arcuate cross section so as to extend along a line defined by the outer peripheral surfaces of the crankshaft counter-weights during rotation of the crankshaft. The baffle plates have oil return holes 27 defined therein for allowing the lubricating oil to drain from the bridge into oil pan Po.

The legs 16 have upper surfaces joined to the flat lower surfaces of the bearing caps 11 and the journal walls 7. The bearing caps 11 and the journal walls 7 are precisely positioned relative to each other by tubular positioning pins 19 fitted in and across substantially the transversely central portions of the joined surfaces of the bearing caps 11 and the journal walls 7. The positioning pins 19 define lubricating oil passages therethrough.

The bridge 14 and the bearing caps 11 are fastened together and to each of the journal walls 7 by a pair of first connecting bolts 20 with one bolt positioned on each side of the axis of the crankshaft Sc. The first connecting bolts 20 extend upwardly through the bridge 14 and the bearing caps 11 and are threadedly engaged in the journal walls 7. Second connecting bolts 21 also extend upwardly through the bridge 14 and are threaded into the the journal walls 7; the second connecting bolts 21 being positioned outwardly of the first connecting bolts 20. The first and second connecting bolts 20, 21 extend parallel to each other and are disposed close to the crankshaft Sc. As shown in FIG. 1, the first and second connecting bolts 20, 21 on the righthand side of the crankshaft Sc extend across the cylinder axis L1—L1 of the left cylinder housing 1, and the first and second connecting bolts 20, 21 on the lefthand side of the crankshaft Sc extend across the cylinder axis L2—L2 of the right cylinder housing 1.

The bridge 14 has a main oil passage or gallery 22 defined longitudinally through the main portion 15, and a plurality of branch oil passages 23 defined respectively in the legs 16 and branched upwardly from the main gallery 22. The branch oil passages 23 communicate through the tubular positioning pins 19 with oil passages 24, respectively, defined in the bearing caps 11. The oil passages 24 open at the bearing surfaces of each of the bearing halves 9.

The bearing halves 8, 9 in the journal walls 7 and the bearing caps 11 jointly define a plurality of bearing holes 25 in which journal portions of the crankshaft Sc are rotatably supported by sleeve bearings 26.

The operation and function of this first embodiment of the present invention will now be described. When the internal combustion engine employing the cylinder block B of an aluminum alloy is operated, the explosion pressure acting on the pistons in the cylinder bores 3 is imposed on the crankshaft Sc along the cylinder axes L1—L1 and L2—L2 to subject the crankshaft to external forces such as bending and twisting forces. The bearing caps 11 and the bridge 14 are secured together to the journal walls 7 by the first connecting bolts 20, and the bridge 14 is secured to the journal walls 7 by the second connecting bolts 21. The first and second connecting bolts 20, 21 on the lefthand and righthand sides are disposed close to the crankshaft Sc so that they extend across the cylinder axis L1—L1 of the left cylinder housing 1 and the cylinder axis L2—L2 of the right cylinder housing 1, respectively. Therefore, the bearing caps 11 and the bridge 14 are firmly coupled to the journal walls 7 such that the portions on which the above-described external forces are imposed are reinforced to increase the rigidity of the crankshaft supporting portion as a whole. Therefore, the crankshaft Sc will rotate smoothly while reducing noise and vibration. The arcuate shaped baffle plates 17 provide substantial strength to the bridge 14 with minimum weight and are effective in suppressing the agitation of oil in the oil pan Po otherwise caused by the crankshaft Sc. Lubricating oil collecting on the baffle plates 17 flows back through the holes 27 to the oil pan Po.

Since the first and second connecting bolts 20, 21 are located inwardly of the positions where the crankcase 2 and the oil pan Po are coupled together, only one sealing gasket is required between the crankcase 2 and the oil pan Po. Therefore, the seal structure between the crankcase 2 and the oil pan Po is simple. Since the cylinder block B and the bridge 14 both are made of an aluminum alloy, their coefficients of thermal expansion are the same whereby they will expand identically and bearing caps 11 will not be axially distorted due to thermal expansion even though the bearing caps 11 are formed of an iron alloy for increasing the rigidity of the crankshaft supporting portion.

Figure 4:
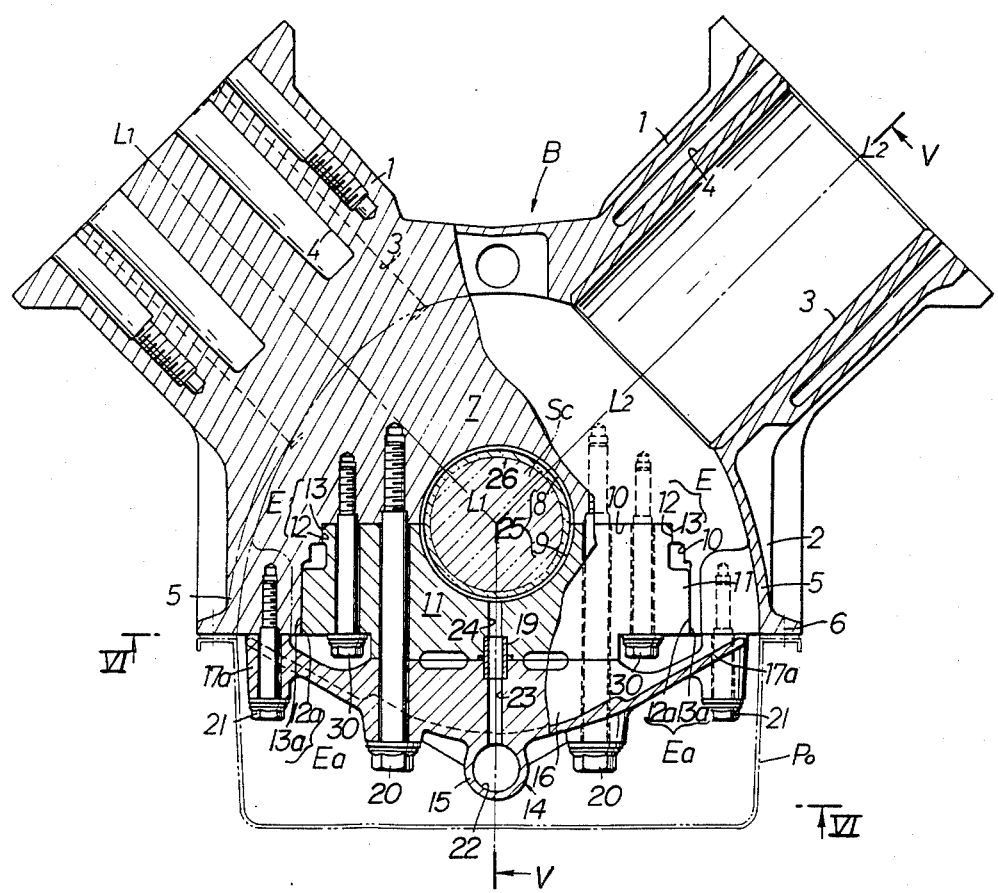
FIG. 4 is a sectional end view similar to FIG. 1 of a second embodiment of the crankshaft support structure of this invention.
Figure 5:
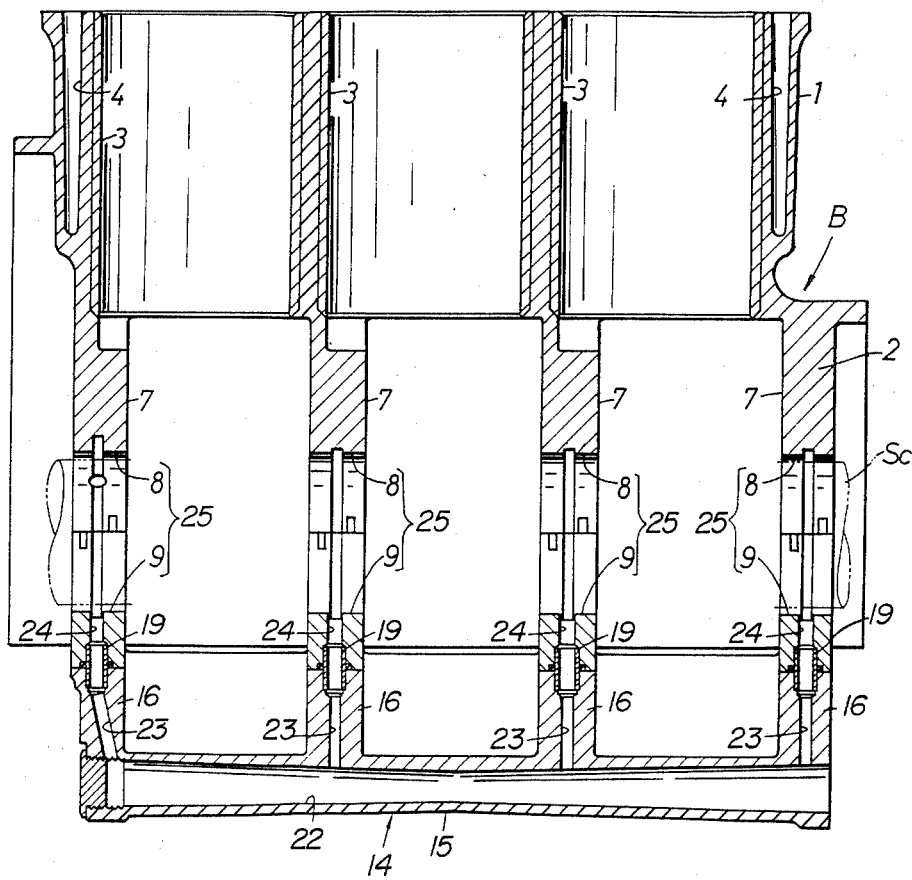
FIG. 5 is a sectional side view of the structure of FIG. 4 taken substantially on the line V—V in FIG. 4.

Referring now to FIGS. 4–6 illustrating a second embodiment of this, the components and functions are substantially similar to the first embodiment except for the cross-sectional shape of the bridge 14 and bearing caps 11, and therefore only those differences will be described in detail.

In this second embodiment, the recess 10 in each journal wall 7 is wider in the lateral direction and, in turn, each bearing cap 11 and the bridge 14 are also wider. In addition to the closely fitting mating surfaces 12 and 13 on the journal walls 7 and bearing caps 11, respectively, loosely fitting mating surfaces 12a and 13a are provided on opposite sides outwardly from mating surfaces 12 and 13 for forming second mating surfaces Ea. First connecting bolt 20 pass through the bridge 14 and bearing caps 11 closely spaced from the crankshaft substantially identical to those of the first embodiment. Similarly, the second connecting bolts 21 fasten the outer lateral extremes 17a of the bridge directly to the journal walls 7 on a portion of the skirt 5 at a location laterally wider than in the first embodiment, although still spaced inwardly of the vertical walls of the oil pan Po and connection flange 6.

The principal difference in this second embodiment is the addition of a pair of third connecting bolts 30 connecting each bearing cap 11 directly to each journal wall 7 independant of the bridge 14 which permits mounting the cranshaft Sc in the block B before installing the bridge 14. As shown, each connecting bolt 30 is positioned between the first and second connecting bolts 20 and 21, respectively, on each side. This third pair of connecting bolts adds both convenience and increased rigidity. The wing portions 17a of the bridge 14 add strength and enhance the noise suppression.

The invention claimed is:

1. A crankshaft supporting structure in a multicylinder internal combustion engine, including a plurality of bearing caps secured respectively to a plurality of journal walls integral with a crankcase of a cylinder block, a crankshaft rotatably supported between said journal walls and said bearing caps, at least one counterweight on said crankshaft, and a bridge interconnecting said bearing caps, said bridge including a plurality of integral baffle plates extending between locations of the bearing caps and curved along a path of outer peripheral surfaces of each counterweight on said crankshaft, wherein said bridge includes an oil supply gallery which extends substantially along a length of said bridge and generally parallel to the crankshaft and a plurality of branch passages are provided in said bridge and said bearing caps extending from said gallery to a bearing hole defined by each said journal wall and bearing cap.

2. A crankshaft supporting structure in a multicylinder internal combustion engine having a plurality of bearing caps secured to a plurality of journal walls of a crankcase of a cylinder block, a crankshaft rotatably supported between the bearing caps and the journal walls, and a bridge interconnecting the bearing caps, the improvement comprising downwardly opening recesses defined in said journal walls, said bearing caps being fitted in said recesses through first and second mating surfaces, said first mating surfaces being closely fitted between each said recess and each said bearing cap in the vicinity of a bottom wall of said recess, said second mating surfaces being loosely fitted between said recess and said bearing cap in the vicinity of a lower open end of the recess and said bridge extending laterally beyond said bearing caps and being secured to skirt walls of said cylinder block, wherein said bridge includes an oil supply gallery which extends substantially along a length of said bridge and generally parallel to the crankshaft and a plurality of branch passages are provided in said bridge and said bearing caps extending from said gallery to a bearing hole defined by each said journal wall and bearing cap.

3. A crankshaft support structure for a multicylinder internal combustion engine having a crankshaft extending longitudinally in a cylinder block, comprising, a plurality of journal walls extending laterally across and downwardly in the cylinder block beyond the crankshaft, each journal wall having a downwardly facing recess starting at the crankshaft, each recess having inwardly facing surfaces on opposite sides and downwardly facing surfaces, a bearing cap mounted in each recess and having outwardly and upwardly facing surfaces for mating with said inwardly and said downwardly facing surfaces in said recess for accurately and rigidly positioning said bearing cap in said recess, said journal walls and bearing caps rotatably supporting the crankshaft, a bridge extending longitudinally over the bearing caps and laterally beyond the bearing caps, a first pair of bolts extending through said bridge and each bearing cap with one bolt on each said of the crankshaft and threadedly connected to the journal wall, and a second pair of bolts extending through only said bridge laterally beyond the bearing cap with one bolt on each lateral side and threadedly connecting to the journal wall, wherein said bridge includes an oil supply gallery which extends substantially along a length of said bridge and generally parallel to the crankshaft and a plurality of branch passages are provided in said bridge and said bearing caps extending from said gallery to a bearing hole defined by each said journal wall and bearing cap.

4. The structure of claim 3 wherein each journal wall recess includes second inwardly facing surfaces located outwardly and below the first said inwardly facing surfaces, and said bearing caps each have second outwardly facing surfaces for engaging said second inwardly facing surfaces on the journal recess.

5. The structure of claim 4 wherein the first said inwardly facing surfaces on the journal recess more closely fits the mating bearing cap surfaces than said second inwardly facing surfaces.

6. The structure of claim 3 wherein a third pair of bolts extends through only each said bearing cap with one bolt on each side of the crankshaft and is threadedly connected to the journal wall.

7. The structure of claim 6 wherein the journal walls extend laterally and substantially completely across the cylinder block, said second pair of bolts engage said bridge and said journal walls near an outermost edge of said bridge, and said third pair of bolts is located laterally between the first and second pairs of bolts.

8. The structure of claim 3 wherein said bridge includes arcuate baffle plates which extend between each journal wall, and means for allowing oil to drain from each baffle plate.

9. The structure of claim 8 wherein each said baffle plate is closely spaced from a path of rotation of the crankshaft.

10. The structure of claim 3 wherein tubular dowels are provided in said branch passages between said bridge and bearing caps for precisely joining the bridge and bearing caps.

11. A crankshaft supporting structure in a multicylinder internal combustion engine having a plurality of bearing caps secured to a plurality of journal walls of the crankcase of a cylinder block for rotatably supporting a crankshaft, comprising, each journal wall having downwardly opening recesses for receiving and mating with said bearing caps through horizontal and vertical mating surfaces, a bridge extending over the plurality of bearing caps, first means connecting said bridge and bearing caps to the journal walls, and second means spaced outwardly from said first means and connecting said bridge directly to the journal walls, wherein said bridge includes an oil supply gallery which extends substantially along a length of said bridge and generally parallel to the crankshaft and a plurality of branch passages are provided in said bridge and said bearing caps extending from said gallery to a bearing hole defined by each said journal wall and bearing cap.

12. The structure of claim 11 wherein said mating surfaces include a pair of inwardly facing corners on each journal walls on opposite sides of the crankshaft and a pair of outwardly facing corners on each bearing cap on opposite sides of the crankshaft.

13. The structure of claim 12 wherein each said journal wall recess has a portion below said inwardly facing corners that is spaced from the bearing cap.

14. The structure of claim 12 wherein said mating surfaces include a pair of inwardly facing surfaces on each said journal walls below and outwardly of said inwardly facing corners and a pair of outwardly facing surfaces on each bearing cap for loosely engaging said inwardly facing surfaces.

15. The structure of claim 11 wherein a third means separately connects each said bearing cap to the journal walls without said first and second means.

16. The structure of claim 1, wherein said third means is laterally positioned between said first and second means.

17. The structure of claim 11 wherein said bridge includes arcuate baffle plates extending between the location of each journal wall, and means for allowing oil to drain from each baffle plate.

18. The structure of claim 17 wherein each said baffle plate is closely spaced from a path of rotation of the crankshaft.

19. The structure of claim 11 wherein tubular dowels are provided in said branch passages between said bridge and bearing caps for precisely joining the bridge and bearing caps.

* * * * *